United States Patent Office 2,820,822
Patented Jan. 21, 1958

2,820,822
PREPARATION OF GUANIDINO TYPE COMPOUNDS

William G. Skelly, Northbrook, Ill., assignor to International Minerals & Chemical Corporation, a corporation of New York No Drawing. Application February 1, 1956
Serial No. 562,627

9 Claims. (Cl. 260—534)

This invention relates to the preparation of guanidino type compounds. More particularly, it relates to a method for the manufacture of guanidino substituted fatty acids such as glycocyamine.

A number of processes are known whereby alpha-guanidino substituted fatty acids may be prepared. For example, glycocyamine has been prepared by heating guanidine carbonate with glycine. Glycocyamine has also been prepared by the reaction of glycine with cyanamide in the presence of ammonia. In still another method, glycocyamine has been prepared by the reaction of thiourea with an alkyl halide and glycine.

All of these methods are wanting in at least one respect. Either the yields are poor or the method requires expensive reactants or the method is cumbersome or commercially unfeasible for one reason or another. In the reaction of thiourea with an alkyl halide and glycine, for example, an anhydrous solvent is needed rendering acceptance of this method very limited. In addition, the use of thiourea in the preparation of, for example, glycocyamine, results in the production of a mercaptan by-product and thereby, a disposal problem.

It is an object of this invention to provide a process for the manufacture of guanidino type compounds which overcomes the limitations and disadvantages of processes heretofore utilized.

It is a further object of the instant invention to provide a process whereby alpha-guanidino substituted fatty acids are produced in acceptable yields from raw materials which are readily available and without requiring the use of solvents.

It is a further object of the instant invention to provide a commercially feasible process wherein pure glycocyamine is produced in acceptable yields from readily available raw materials.

These and other objects of the instant invention will become more apparent upon a fuller understanding of the invention as hereinafter described.

It has been discovered that guanidino substituted fatty acids can be prepared by a process which comprises the reaction of a carbamide in which no more than one hydrogen of the amino groups separated by a single carbon atom has been replaced by a hydrocarbon radical, with a dialkyl sulfate, the alkyl group of which contains no more than six carbon atoms, and the reaction of the resulting mixture with an amino fatty acid in the presence of hydroxyl ions. Guanidino substituted fatty acids are separated from the resulting reaction products.

More specifically, an alpha-guanidino substituted fatty acid is produced by the reaction of a carbamide, in which no more than one hydrogen of the amino groups separated by a single carbon atom has been replaced by a hydrocarbon radical, with a dialkyl sulfate, the alkyl group of which contains no more than six carbon atoms, adding to the resulting reaction products an alpha-amino fatty acid and a strong base, and allowing the reaction to proceed to substantial completion.

The carbamide which is employed in practicing the instant novel process may be represented by the following general formula:

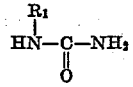

$R_1$ is any alkyl radical such as methyl, ethyl, butyl, butenyl, or aryl such as phenyl, benzyl, and the like.

In one embodiment of the instant novel process, an alpha-guanidino substituted fatty acid, such as glycocyamine, is formed from the reaction of a carbamide, such as urea, and a dialkyl sulfate, such as diethyl sulfate, and an alpha-amino acid, such as glycine, in the presence of a strong base, such as sodium hydroxide, by the following equations:

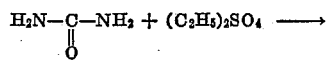
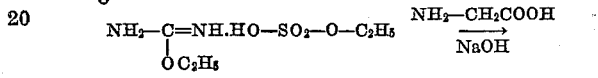
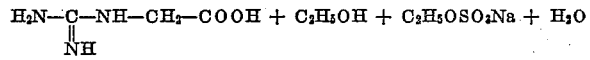

In practicing one embodiment of the instant novel process, a carbamide, in which no more than one hydrogen of the amino groups separated by a single carbon atom has been replaced by a hydrocarbon radical, such as urea, reacts with a dialkyl sulfate, the alkyl group of which contains no more than six carbon atoms, such as diethyl sulfate, at a temperature of between about 80° C. and the decomposition temperature of the carbamide, e. g. about 125° C. After the reaction has proceeded to substantial completion, between about one and about five hours, a solution containing a base, such as sodium hydroxide, and a solution of an alpha-amino acid, such as glycine, is mixed with the above reaction products, the amount of base being sufficient to produce a mixture having a pH between about 10.0 and about 10.3. This mixture is allowed to stand until the reaction has proceeded to substantial completion, for instance, at least about four hours. The alpha-guanidino substituted fatty acid, such as glycocyamine, crystallizes from the reaction mixture. Pure glycocyamine is obtained by separating the crystals from the liquor, such as by filtration, washing, and drying.

The reaction may be carried out using any dialkyl sulfate in which the alkyl group contains no more than six carbon atoms. For example, dimethyl sulfate, diethyl sulfate, dibutyl sulfate may be employed. However, diethyl sulfate is the preferred alkylating agent because of its ready availability and because, unlike dimethyl sulfate, it is not toxic. When dialkyl sulfates are used, they also function as an anhydrous solvent, thus eliminating the necessity of using an organic solvent such as alcohol. The use of these dialkyl sulfates also eliminates the necessity of solvent recoveries and use of reflux equipment.

In practicing the instant novel process, a non-polar solvent may be used; however, in the preferred practice, no solvent other than the dialkyl sulfate is used.

All of the carbamides in which no more than one hydrogen of the amino groups separated by a single carbon atom has been replaced by a hydrocarbon radical are useful for purposes of the instant invention. For example, urea, alkyl ureas such as methylurea, ethylurea, and propylurea, etc. may be used.

When in the practice of the instant novel process, urea is employed as the carbamide, an alkyl acid sulfate, and not the sulfate salt, is formed as an intermediate product. Maximum yields are obtainable when the temperature is maintained at between about 90° and about 100° C. for about one hour. However, higher or lower temperatures may also be employed if decreased yields are acceptable. If lower temperatures are employed, the period of heating must be extended in order to obtain a good yield of the product but the reaction does not go to completion below 90° C. The maximum reaction temperature which may be employed is the decomposition temperature of urea.

In the preferred practice of this embodiment of the instant invention, about one mole of urea is admixed with between about one half mole and about one mole of diethyl sulfate at a temperature of between about 90° C. and about 100° C. for at least one hour. The resulting mixture is cooled, and a solution containing sodium hydroxide and about one mole of glycine is added thereto. The amount of sodium hydroxide is sufficient to adjust the pH of the resulting mixture to between about 10.1 and about 10.3. The resulting mixture is agitated and then allowed to stand for about eight hours at atmospheric temperature. Glycocyamine crystallizes from the reaction mixture, and pure glycocyamine is recovered by separating the crystals from the liquor, washing, and drying.

Although sodium hydroxide is the preferred base employed in practicing the instant novel process, other strong bases may also be used, for example, potassium hydroxide, calcium hydroxide, barium hydroxide, and the like.

In practicing the instant invention, the preferred mole ratio of dialkyl sulfate to urea is about 1:1. At ratios outside of this range, as for example, between about 2:1 and about 6:1, yields are somewhat less than when using the preferred mole ratio.

All of the alpha-amino acids, such as glycine, sarcosine, N-ethylglycine, alanine, phenylalanine, gamma-aminobutyric acid, beta-alanine, glutamic acid, and the like are useful in practicing the instant invention.

By the method of the instant invention, alpha-guanidino substituted fatty acids, such as glycocyamine, N-methylglycocyamine, alpha-guanidinopropionic acid, alpha-guanidinobutyric acid, and the like may be prepared. Such compounds have utility as pharmaceuticals, alone or in combination with other compounds.

The invention will be further understood from a study of the following example thereof, which is given without intention to limit the invention thereto.

*Example*

About one mole of urea is treated with about one mole of diethyl sulfate, and the resulting mixture stirred in an oil bath at between about 90° C. and about 95° C. for between about one and about three hours. The resulting mixture is cooled and added to about one mole of glycine stepwise and alternatingly with sufficient 4 N sodium hydroxide solution to produce a mixture with a pH of about 10.2±0.05. The glycine mixture is agitated at about 60° C. during the addition. The resulting mixture is agitated and allowed to stand for at least about four hours. Glycocyamine crystallizes out, and is filtered from the liquor, washed once with twice its weight in cold water, and dried. Pure glycocyamine is recovered in at least about 50% yield.

This application is a continuation-in-part of application Serial No. 201,856 filed by William G. Skelly and Bruno Vassel on December 20, 1950, and now abandoned, said application being entitled "A Chemical Process."

Having thus fully described and illustrated the character of the invention, what is desired to be secured and claimed by Letters Patent is:

1. A process for preparing guanidino type compounds which comprises reacting a carbamide, in which no more than one amino group includes a hydrocarbon radical as a substituent for hydrogen thereon, with a dialkyl sulfate, the alkyl group of which contains no more than six carbon atoms, adding to the resulting product an alpha-amino fatty acid and sufficient strong inorganic base to produce a mixture having a pH between about 10.0 and about 10.3 and recovering an alpha-guanidino substituted fatty acid therefrom upon substantial completion of the reaction.

2. The process of claim 1 in which the reaction between the carbamide and dialkyl sulfate is carried out at a temperature between about 90° C. and about 100° C.

3. The process of claim 2 in which said strong inorganic base is selected from the group consisting of alkali metal and alkaline earth metal hydroxides.

4. The process of claim 1 in which the carbamide is urea.

5. The process of claim 4 in which the reaction between urea and the dialkyl sulfate is carried out at a temperature between about 90° C. and 100° C.

6. The process of claim 5 in which the strong base is an alkali metal hydroxide.

7. The process of claim 6 in which the dialkyl sulfate is diethyl sulfate and the alkali metal hydroxide is sodium hydroxide.

8. The process of claim 4 in which the reaction between urea and dialkyl sulfate is carried out at a temperature between about 90° C. and about 100° C. for between about one hour and about five hours.

9. The process of claim 8 in which the dialkyl sulfate is diethyl sulfate and the strong base is an alkali metal hydroxide.

References Cited in the file of this patent
UNITED STATES PATENTS

| 1,967,400 | Fischl | July 24, 1934 |

FOREIGN PATENTS

| 1,079,728 | France | Dec. 2, 1954 |

OTHER REFERENCES

Werner: J. Chem. Soc. (London), vol. 105 (1914), pgs. 923–929.

Brand et al.: Organic Synthesis, Collective, vol. III (1955), pgs. 440–442.